(12) United States Patent
Nothdurfter et al.

(10) Patent No.: US 10,526,245 B2
(45) Date of Patent: Jan. 7, 2020

(54) METHOD FOR PARTIALLY COATING A SURFACE OF AN OBJECT

(71) Applicant: D. Swarovski KG, Wattens (AT)

(72) Inventors: Heinz Nothdurfter, Fritzens (AT);
Rudolf Ernst Altenberger, Kolsass (AT); Franz Kaltenecker, Jenbach (AT); Arno Recheis, Mils (AT)

(73) Assignee: D. Swarovski KG, Wattens (AT)

( * ) Notice: Subject to any disclaimer, the term of this patent is extended or adjusted under 35 U.S.C. 154(b) by 0 days.

(21) Appl. No.: 15/307,870

(22) PCT Filed: May 21, 2014

(86) PCT No.: PCT/EP2014/060484
§ 371 (c)(1),
(2) Date: Oct. 31, 2016

(87) PCT Pub. No.: WO2015/176757
PCT Pub. Date: Nov. 26, 2015

(65) Prior Publication Data
US 2017/0066685 A1 Mar. 9, 2017

(51) Int. Cl.
*C03C 17/09* (2006.01)
*C03C 17/36* (2006.01)
*A44C 17/00* (2006.01)

(52) U.S. Cl.
CPC ........ *C03C 17/3684* (2013.01); *A44C 17/008* (2013.01); *C03C 17/09* (2013.01);
(Continued)

(58) Field of Classification Search
CPC . C03C 17/09; C03C 17/007; C03C 2218/328; C03C 2218/34;
(Continued)

(56) References Cited

U.S. PATENT DOCUMENTS 2,559,969 A 7/1951 Kennedy et al.
3,135,046 A * 6/1964 Stookey ................. C03C 17/10
156/248

(Continued)

FOREIGN PATENT DOCUMENTS

CA 590544 A 1/1960
EP 0109591 A1 5/1984
(Continued)

OTHER PUBLICATIONS

Examination Report; Korean Patent Application No. 10-2016-7031123; dated Nov. 24, 2017; Korean Intellectual Property Office; Daejeon, Republic of Korea.
(Continued)

*Primary Examiner* — Elizabeth A Burkhart
(74) *Attorney, Agent, or Firm* — Stevens & Showalter LLP

(57) ABSTRACT

The invention relates to a method for partially coating a surface of an object, comprising the following steps: (a) optional hydrophobization of the surface of the object; (b) partial application of (b1) a liquid and subsequent application of a powderous or granular substance or (b2) a solution or suspension of said powderous or granular substance in a liquid; (c) drying the surface to form spatially-delimited salt or powder crusts; (d) coating the surface with at least one layer of a metal or a metal compound; and (e) removing the salt or powder crusts that have been produced. The invention also relates to products that have been produced according to the claimed method.

9 Claims, 3 Drawing Sheets

Coating material Zr/ZrN

(52) U.S. Cl.
CPC ...... *C03C 17/3615* (2013.01); *C03C 17/3626* (2013.01); *C03C 2218/15* (2013.01); *C03C 2218/34* (2013.01)

(58) Field of Classification Search
CPC ........ C03C 2218/355; C03C 17/00–44; A44C 27/006; A44C 17/001; A44C 17/008; C23C 14/042
USPC .......................................... 427/165, 166, 168
See application file for complete search history.

(56) References Cited

U.S. PATENT DOCUMENTS

| | | | |
|---|---|---|---|
| 4,552,785 A * | 11/1985 | Wartenberg | B28B 11/04 427/226 |
| 6,099,905 A * | 8/2000 | Roquette | C03C 17/04 427/279 |
| 2004/0083759 A1* | 5/2004 | Starcke | A44C 17/00 63/32 |
| 2006/0182883 A1* | 8/2006 | Neogi | C04B 41/009 427/240 |
| 2007/0036891 A1* | 2/2007 | Peters | C23C 14/042 427/115 |
| 2009/0282685 A1* | 11/2009 | Recheis | A44C 17/002 29/896.41 |

FOREIGN PATENT DOCUMENTS

| | | |
|---|---|---|
| EP | 0 390 465 A2 | 3/1990 |
| EP | 0572324 A1 | 12/1993 |
| EP | 0 686 496 A1 | 5/1994 |
| JP | S48-038244 A | 6/1973 |
| JP | S59152243 A | 8/1984 |
| JP | H05335638 A | 12/1993 |
| JP | 2013101857 A | 5/2013 |
| KR | 1020010074744 | 8/2001 |
| KR | 100789581 B1 | 12/2007 |
| WO | 1991015132 A1 | 10/1991 |
| WO | 2015176757 A1 | 11/2015 |

OTHER PUBLICATIONS

International Search Report and Written Opinion; International Application No. PCT/EP2014/060484; dated Sep. 17, 2014; European Patent Office; Rijswijk, Netherlands.
International Preliminary Report on Patentability; International Application No. PCT/EP2014/060484; dated Nov. 22, 2016; European Patent Office; Munich, Germany.
Abstract of German Patent, DE3109927 C2, Mar. 8, 1984, 1 page.
Abstract of European Patent, EP0788876 B1, Sep. 1, 1999, 1 page.
Abstract of European Patent, EP0909748 A1 , Apr. 21, 1999, 1 page.
International Search Report for PCT/EP2014/060484, dated Sep. 17, 2014, 3 pages.
Notice of Reasons for Refusal; Japan Patent Application No. 2016-565397; dated Jan. 23, 2018; Japan Patent Office; Tokyo, Japan.
Communication Regarding Article 94(3) EPC; European application No. 14729874.9; dated Feb. 28, 2018; European Patent Office; Munich, Germany.
Notice of Reasons for Refusal; Japanese Application No. 2016-565397; dated Nov. 15, 2018; Japan Patent Office; Tokyo, Japan.
Notice of Submission of Opinion; Korean Application No. 10-2016-7031123; Sep. 21, 2018; Korean Intellectual Property Office; Daejeon, Republic of Korea.

* cited by examiner

Coating material Zr/ZrN

Coating material Cr

Coating material Cr

METHOD FOR PARTIALLY COATING A SURFACE OF AN OBJECT

CROSS REFERENCE TO RELATED APPLICATIONS

This application is the national stage entry of International Patent Application No. PCT/EP2014/060484 having a filing date of May 21, 2014, the entire contents of which are incorporated herein by reference.

FIELD OF THE INVENTION

The invention relates to a method for partially coating a surface of an object that can be used extremely simply and therefore cost-effectively in numerous applications, especially for producing gemstones with a patina effect.

PRIOR ART

In the field of the jewelry industry, methods for designing surfaces decoratively are increasingly sought. For this purpose, glass and ceramic surfaces are often provided with coatings that cause certain color effects.

Partial coatings of surfaces in the form of predefined patterns are mostly effected by applying masks in two-dimensional surfaces, such as tiles.

For example, from EP 0 909 748 B1 (Giulini), a method for producing a decorative effect on ceramic surfaces, especially tiles, and an application method for coloring have been known, which enables dot and line patterns, for example. Thus, a method is applied in which a ceramic surface, optionally pretreated with water and/or an adhesion promoter, is provided with a layer that contains powdery color pigments or powdery coloring water-soluble metal salts, said layer is provided with water after the application, and the ceramic material is fired in an oven at up to 1400° C.

A process for producing porphyry decorative effects on a ceramic material (tiles) is described in DE 3109927 C2 (Zschimmer and Schwarz); it uses a screen-printing stencil. The ceramic material is subsequently dried and fired.

EP 0 788 876 B1 (Borsi) relates to a process for selective coating regions of a transparent support plate with a metallic effective layer.

EP 0 686 496 (Hsiung) relates to a laminated ornamental glass in which a net of printing inks comprising ceramically colored glass bulk and glass powder is directly applied to a glass plate.

Further, the skilled person knows that the coating of regions can be obtained by vapor deposition, for example, using a mask. However, this method cannot be used for irregular three-dimensional shapes, such as gemstones, especially facetted gemstones. It is the object of the present invention to provide a method that is suitable for the partial coating of three-dimensional objects, especially gemstones, providing a so-called "patina effect".

DESCRIPTION OF THE INVENTION

Figure 1:
FIG. 1 shows a perspective view of glass substrates coated with Zr/ZrN to provide a patina effect.

Therefore, the invention relates to a process for partially coating a surface of an object, comprising the following steps:
(a) optionally hydrophobizing the surface of the object;
(b) partially applying
   (b1) a liquid followed by applying a powdery or granular substance; or
   (b2) a solution or suspension of the powdery or granular substance in a liquid;
(c) drying the surface to form spatially delimited salt or powder crusts;
(d) coating the surface with at least one layer of a metal or metal compound;
(e) removing the salt or powder crusts that have been produced.

Surprisingly, it has been found that a method according to claim 1 achieves the object of the invention, and that even small three-dimensional objects with slanted surfaces (facets) are coated very well without the partial coating becoming detached. The method according to the invention provides a pronounced "patina effect" on all coated surfaces of the object, which cannot be obtained by classical masking methods.

The object that is coated in the method according to the invention may be produced from a wide variety of materials, such as glass, ceramic, plastic, metal, natural stone, etc. Also, gemstones or semi-precious stones may be employed, such as topaz, zirconia or rock crystal. Objects having a particularly smooth (about 4-10 nm surface roughness) surface are preferred. Preferably, the method according to the invention is performed with objects which are decorative elements made of glass or ceramic; preferably, they are a polished facetted glass element. The partial coatings of the objects masked in this way are extremely stable and behave as stable as objects with a complete coating in the application tests usual in the jewelry industry.

The present invention further relates to partially coated objects produced by the method according to the invention. Suitable materials are mentioned in the previous paragraph. Objects produced from glass or ceramic composition are particularly preferred, especially facetted gemstones of glass or ceramic. Polished facetted glass elements are preferred according to the invention. The usual masking methods are totally unsuitable for the partial masking of, in particular, facetted decorative elements, since on the one hand they cannot successfully realize a partial coating cost-effectively on three-dimensionally shaped surfaces, and on the other hand, it is not possible to diffrentiate coated and uncoated regions visually in a sufficiently sharp way, so that they are not perceived as a gradual transition.

The "patina effect" of the objects masked according to the invention is obtained from the purely random distribution in step (b), and the succession of the process steps.

Pretreatment of the Objects: Hydrophobization (a)

In a variant of the method according to the invention, the surface of the object is hydrophobized in a step (a) before the partial wetting is effected in step (b). Suitably, the objects should be washed before the hydrophobization. This hydrophobization results in the formation of liquid droplets during the partial wetting effected in step (b), which result in particularly homogeneous partial coating effects in the subsequent steps. For example, the hydrophobization is effected with solutions of quaternary ammonium compounds on a fatty acid basis (e.g., Arquad® HCV; dihydrogenated tallow dimethylammonium chloride; about 0.2% by volume in water) commercially available from a great number of companies. Also suitable are silicone-based hydrophobizing agents, such as silanes, oligomeric siloxanes, polydimethylsiloxanes, or silicone resins, marketed, for example, under the trademark Tego® Phobe. Perfluorohydrocarbon compounds may also be suitable for hydrophobization.

Masking Step (b)

The masking step itself can be effected in one of two different ways.

Variant 1

At first, a liquid that forms droplets on the object's surface is applied. The applied droplets usually have diameters of 0.1 to 2.0 mm. Depending on the surface quality, suitable liquid may include water, alcohols, oils or any mixture thereof. Preferably, the application is performed by means of one or more spraying nozzles. The liquid can be applied from the nozzles as a mist/vapor. According to the invention, applying the liquid by a screen/brush method, in which the droplets are virtually sprayed on, is also suitable, for example. Water is preferably used as the liquid. Thereafter, the actual masking material is applied, for example, by a powder caster. Suitable according to the invention are all powdery or granular substances, such as salts, sugar, lime, flour, powdery adhesives on the basis of polyvinyl alcohol granules (e.g., Mowiol®), fine sand etc. Preferably, common salt, polyvinyl alcohol granules, sugar, flour, gypsum and icing sugar are employed as masking materials. With them, the most durable and homogeneous surfaces are obtained. According to the invention, grain sizes of the masking materials of about 0.01 to 1 mm, preferably about 0.2 to 0.5 mm, are suitable. In a particularly preferred variant according to the invention, a spraying mist of water is applied, and then salt is applied in a granular form.

Variant 2

Instead of the two-step process of variant 1, a solution or suspension of the masking material in a liquid is prepared and applied. The applying is effected as in variant 1. Solutions of salt or sugar in water or suspensions of boron nitride or gypsum in water are preferred according to the invention. Lacquers and paints in a solvent, or paint sprays, may also be suitable.

Drying Step (c)

In the next step of the method according to the invention, the masked object is dried to form salt or powder crusts. Preferably, the drying is effected at temperatures of at least 40° C. This can be done in an oven or drying cabinet at about 40-70° C. for about 5-15 minutes. However, the masked object may also be dried simply at room temperature, of course with an increased expenditure of time.

Coating Step (d)

In the coating step (d), at least one layer of a metal and/or metal compound, such as metal oxides, metal nitrides, metal fluorides, metal carbides or any combination of these compounds, is applied in any order by one of the common coating methods. Successive layers of different metals or metal compounds may also be applied.

The coating methods include, among others, PVD (physical vapor deposition), CVD (chemical vapor deposition) and painting. Physical vapor deposition is preferably suitable according to the invention. The PVD methods are a group of vacuum-based coating methods or thin layer technologies that are sufficiently well known to the skilled person and are employed, in particular, for coating glass and plastic in the optical and jewelry industries. In the PVD process, the coating material is transferred into the gas phase. The gaseous material is subsequently led to the coated substrate, where it condenses and forms the target layer. With some of these PVD methods (magnetron sputtering, laser beam evaporation, thermal vapor deposition, etc.), very low process temperatures can be realized. In this way, a large number of metals can be deposited in a very pure form in thin layers. If the process is performed in the presence of reactive gases, such as oxygen, metal oxides may also be deposited. A preferred method according to the invention is a coating process by sputtering.

Depending on the requirements of function an optical appearance, a typical layer system for producing the desired effect can consist of only one layer, but also of a large number of layers. In practice, the method is mostly limited to layer numbers of 1 to 25. A typical layer thickness varies between 5 and 800 nm. In particular, Cr, $Cr_2O_3$, Fe, $Fe_2O_3$, Al, $Al_2O_3$, Au, SiO, $SiO_2$, Mn, Si, $Si_3N_4$, $TiO_2$, Cu, Ag and Ti are suitable as coating materials.

Suitable coatings according to the invention include, for example, metal mirrors with a high contrast (Al, Cr or Ag), which are optionally protected from corrosion by a suitable protective layer. One example of such a metal mirror is the layer sequence of Al and $SiO_2$. Also suitable as coating materials are absorbing materials that, because of their absorption behavior, transmit or reflect only certain fractions of the visible light in a wavelength-selective manner and are thus colored, for example, $Fe_2O_3$. Also suitable according to the invention are layer systems constituted of dielectric materials, which transmit or reflect only certain fractions of the visible light because of interference phenomena, and thereby become colored; for example, the sequence of $TiO_2$, $SiO_2$, $TiO_2$, $SiO_2$, $TiO_2$, $SiO_2$, $TiO_2$, $SiO_2$ on glass.

The effect coatings are preferably applied by means of two PVD methods (vapor deposition or sputtering) that are commercially available and well known to the skilled person. In both methods, the layer-forming particles are introduced as a solid into an evacuated process chamber. The desired coating materials are transferred into the gas phase and move towards the surface to be coated, on which they condense. The evacuation before the coating is necessary in order that the layer-forming vapor particles reach the surface to be coated of the substrate without collision with other gaseous particles. In the vapor deposition technology, the coating materials are transferred into the gas phase by resistively or inductively heating a source filled with the layer material and heating the material to the boiling point. Another thermal evaporation method is the so-called electron beam evaporation, in which the evaporation energy is generated by means of a high energy electron beam. The techniques are sufficiently known to the skilled person. In particular, the use of cubic machines equipped with thermal evaporators and electron beam guns is suitable. For example, the model BAK1101 of Evatec can be employed.

In the sputtering technology, high energy gas ions are accelerated in a vacuum process chamber onto the surface of a target, from which atoms are detached by mechanical impacts. The target consists of the same material of which the desired layer is to be formed ultimately. The detached particles impinge on the substrate and condense on the surface. For example, the model DynaMet4V of the company Leyboldoptics is suitable as a plant.

Removing the Powder or Salt Crusts (e)

In the last process step, the salt or powder crusts are removed. In a preferred embodiment of the invention, the spatially delimited salt or powder crusts are removed by washing with water. Preferably, the partially coated objects are treated with warm water (about 40° C.). The salt and powder crusts with the layers present thereon are thereby dissolved and leave uncoated regions (voids) on the coated decorative element. This works especially well with common salt. The salt or powder crusts may also be removed simply mechanically (for example, by means of a soft brush). Surfactant solutions, as well as optionally basic or acidic solutions, optionally under an ultrasonic treatment, may also be employed for removing the powder crusts.

General Process Description

The masking plant consists of a conveying belt, a liquid spraying station, and a granule free-flowing station. The articles to be masked were positioned on a carrier plate. This carrier plate with the elements to be coated was conveyed further on a conveying belt at a constant velocity. Along the conveying path, the articles went through two separate processing steps. In the first step, the articles were passed below a liquid spraying station. A nozzle produced a narrow mist of liquid directed downwards, which deposited on the surfaces below. In the second process step, a granule caster sprinkled the previously wetted surfaces with fine granules, which adhered to the liquid droplets. The masked elements were thereafter dried in a drying oven, before being transferred into the coating plants.

The effect coatings were applied by means of two commercially available PVD methods (vapor deposition or sputtering). The working pressures during the coating were within a range of from $10^{-5}$ to $10^{-4}$ mbar during the vapor deposition, and $10^{-4}$ to $10^{-3}$ mbar during the sputtering.

Thereafter, the masks were washed off with warm water (about 30 to 40° C.).

EXAMPLES

Preliminary Experiments

Example 1 (NaCl)

Facetted glass chatons were wetted with $H_2O$ mist (0.5 mm nozzle) and subsequently scattered with NaCl granules. The thus obtained partially masked substrate was vapor-deposited with Cr. The masking showed good adhesion even on the facets.

Even in vacuum coating processes with a higher temperature evolution, neither evaporation nor decomposition of the NaCl could be observed. The optical appearance of the masking could be controlled and adapted by the amount of the $H_2O$ mist and by the particle size of the salt granules (grain sizes of about 0.2 to 0.5 mm can be employed well).

Example 2 (BN Suspension in $H_2O/CH_3COOH$/Propanol)

The suspension was sprayed through a 0.75 mm nozzle onto facetted chatons. $Al/SiO_2$ and $Cr/SiO_2/Zr/ZrN/Fe_2O_3$ were used as coatings. The masking showed a very good adhesion to the facets and could be removed very well with lukewarm water; very uniform distribution of the droplets; uniform optical appearance on the facets.

Example 3 (Mowiol® Granules, Fine)

Facetted glass chatons were wetted with $H_2O$ mist (0.5 mm nozzle) and subsequently scattered with Mowiol® granules (fine). $Al/SiO_2$ was used as the coating. The masking showed excellent adhesion to the lateral facets. However, in order to remove, i.e., washing off, the masking, the partially coated substrates had to be soaked in water for an extended period of time, which is disadvantageous for industrial applications.

Example 4 (Mowiol® Granules, Unsifted)

Facetted glass chatons were wetted with $H_2O$ mist (0.5 mm nozzle) and subsequently scattered with Mowiol® granules (unsifted). $Al/SiO_2$ was used as the coating. As in Example 3, the masking showed excellent adhesion to the lateral facets. However, as in Example 3, the masking could be successfully removed only after soaking in water for an extended period of time.

Example 5 (Mowiol® Granules, Coarse)

Facetted glass chatons were wetted with $H_2O$ mist (0.5 mm nozzle) and subsequently scattered with Mowiol® granules (coarse). $Al/SiO_2$ was used as the coating. The coarse granules adhered poorly to the facets wetted with spraying mist. As in Examples 3 and 4, the masking could be successfully removed only after soaking in water for an extended period of time.

Example 6 (Mowiol® Solution in Water)

Facetted glass chatons were sprayed with a solution of 20% by weight Mowiol® in water (0.75 mm nozzle). $Zr/ZrO_2$ was used as the coating. The application of the masking proved simple; however, the distribution of droplets is non-uniform.

Example 7 (Chalk Paint Suspension in Water)

Facetted glass chatons were sprayed with a commercially available suspension of chalk paint in water (0.75 mm nozzle). $Al/SiO_2$ and $Zr/ZrN$ were used as coatings. The application of the masking proved easy, and the masking adhered well to the lateral facets; uniform distribution of the droplets; uniform optical appearance of the patina effect.

Example 8 (Moltofill® Suspension in Water)

Facetted glass chatons were sprayed with a suspension of 80 g of Moltofill® in 100 ml of water (0.75 mm nozzle). $Zr/ZrN$ and $Al/SiO_2$ were used as coatings. The application of the masking proved simple, and the masking also adhered very well to the lateral facets. The distribution of the droplets was uniform, and a uniform optical appearance of the patina effect was obtained.

Example 9 (Chalk Paint)

Facetted glass chatons were wetted with a commercially available chalk paint suspension through a screen (mesh size 710 µm; ISO 3310-1) using a brush. $Zr/ZrN$ was used as a coating. The application of the masking was easy; however, the distribution of the droplets was non-uniform, and a non-uniform optical appearance of the patina effect was obtained.

Example 10 (Gypsum Suspension in Water)

Facetted glass chatons were wetted with a suspension of 100 g of gypsum in 100 g of water by a spray-on method using a paintbrush. Al/SiO$_2$ was used as the coating. The application of the masking is simple; however, the masking adheres worse to glass as compared to the other maskings. When the masking is removed (mechanical rubbing), the heavy evolution of dust is disadvantageous. However, the masking can be readily washed off with water.

Example 11 (Sugar)

Facetted glass chatons were wetted with a spraying mist of water (0.5 mm nozzle). Subsequently, sugar crystals were applied through a screen. Al/SiO$_2$ was used as the coating. The application of the masking is simple, and also the masking adheres very well to the lateral facets. However, the masking discolors from caramelization of the sugar during the PVD process. The sugar masking can be washed off readily, and the discoloration also disappears by the washing.

Example 12 (Icing Sugar)

Facetted glass chatons were wetted with a spraying mist of water (0.5 mm nozzle). Subsequently, icing sugar was applied through a screen. Al/SiO$_2$ was used as the coating. The application of the masking is simple, and also the masking adheres very well to the lateral facets. As in Example 14, the masking discolors from caramelization of the sugar during the PVD process. The sugar masking can be washed off readily after the PVD process; the discoloration is no longer visible after the washing.

Example 13 (NaCl Solution in Water)

Facetted glass chatons were wetted with a saturated solution of NaCl in H$_2$O (concentration about 360 g/l at 25° C.; 0.5 mm nozzle). The thus obtained partially masked substrate was coated with Cr and Zr/ZrO$_2$. The masking showed good adhesion also to the facets; however, the layer thickness of the masking material was not sufficient.

Example 14 (Sugar)

Facetted glass chatons were wetted with a spraying mist of a sugar solution (0.5 mm nozzle). Al/SiO$_2$ was used as the coating. The application of the masking is simple, and also the masking adheres very well to the lateral facets. As in Examples 11/12, the masking discolors from caramelization of the sugar during the PVD process. The sugar masking can be washed off readily; the discoloration disappears by the washing.

Technical Process

Because of the preliminary experiments, the method according to Example 1 was selected for a technical fabrication of the glass objects with a patina effect.

Figure 2:
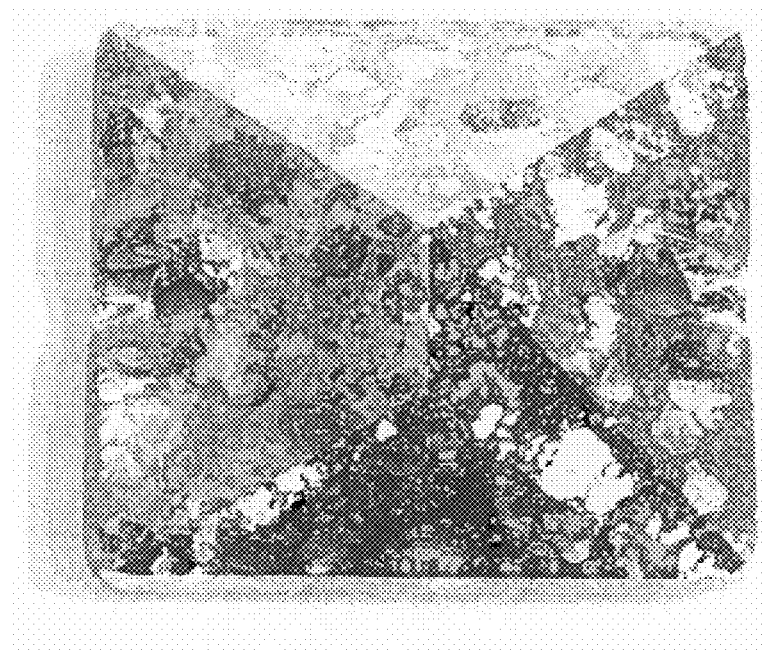
FIG. 2 shows a perspective view of another glass substrate coated with Cr to provide a patina effect.
Figure 3:
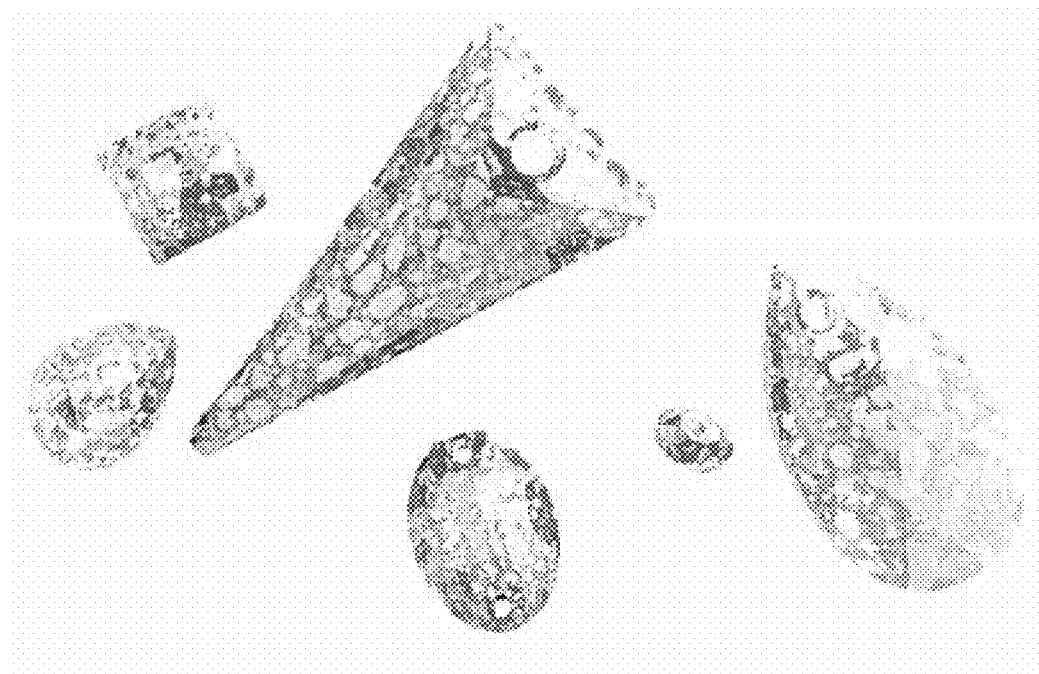
FIG. 3 shows a perspective view of other glass substrates coated with Cr to provide a patina effect.

The technical process for masking was performed with the above described masking plant. NaCl was used as the masking material, and differently facetted glass chatons were used as the substrate. A number of different coatings was applied by the above described PVD methods. After the coating process, the maskings were removed with lukewarm water. FIGS. 1-3 show different glass substrates that have been coated by the method according to the invention. The partially masked substrates show a very beautiful patina effect, which cannot be achieved by the usual masking methods. Surprisingly, the partially masked substrates are as stable as completely coated substrates in all tests usual in the jewelry industry (sea water test, sweat test, UV test, perfume test).

The invention claimed is:

1. A process for partially coating a surface of a three dimensional object with inclined facets with a patina effect coating, the process comprising the following steps:
   (a) hydrophobizing the surface of the three dimensional object with inclined facets;
   (b) through one or more spraying nozzles, partially applying to the surface of the three dimensional object with inclined facets:
      (b1) a liquid followed by applying a powdery or granular removable masking material; or
      (b2) a solution or suspension of the powdery or granular removable masking material in a liquid;
      wherein the step (a) of hydrophobizing the surface of the three dimensional object with inclined facets results in the formation of liquid droplets in step (b), such that the liquid, solution or suspension is partially applied to the surface of the three dimensional object with inclined facets with a random distribution;
   (c) drying the surface to form spatially delimited, randomly distributed removable salt or powder crusts;
   (d) coating the surface with at least one layer of a metal or metal compound; and
   (e) removing the salt or powder crusts that have been produced to leave a patina effect coating on the object.

2. The process according to claim 1, characterized in that said object is a decorative element made of glass or ceramic.

3. The process according to claim 2, characterized in that said decorative element is a polished facetted glass element.

4. The process according to claim 1, characterized in that said liquid is selected from water, alcohols and oils, or any mixture thereof.

5. The process according to claim 1, characterized in that said powdery or granular removable masking material has a grain size of 0.01-1.0 mm.

6. The process according to claim 1, characterized in that said powdery or granular removable masking material is selected from common salt, polyvinyl alcohol granules, sugar, flour, gypsum, icing sugar.

7. The process according to claim 1, characterized in that said drying (c) of the surface is effected at temperatures above 40° C.

8. The process according to claim 1, characterized in that said coating of the surface (d) is effected by physical vapor deposition.

9. The process according to claim 1, characterized in that said removing of the salt or powder crusts that have been produced (e) is effected by washing with water.

* * * * *